United States Patent [19]

Hartman, Sr.

[11] Patent Number: 4,684,834

[45] Date of Patent: Aug. 4, 1987

[54] ELECTROMAGNETIC MOTOR

[75] Inventor: William J. Hartman, Sr., Keystone Heights, Fla.

[73] Assignee: Robert W. Delong, Orlando, Fla. ; a part interest

[21] Appl. No.: 815,463

[22] Filed: Jan. 2, 1986

[51] Int. Cl.$^4$ ............................................. H02K 33/00
[52] U.S. Cl. .......................................... 310/24; 310/35
[58] Field of Search ........................ 310/23, 24, 34, 35; 200/30 A

[56] References Cited

U.S. PATENT DOCUMENTS

| | | | |
|---|---|---|---|
| 538,351 | 4/1895 | Sabin | 310/24 |
| 1,349,100 | 8/1920 | Reynolds | 310/24 |
| 1,912,441 | 6/1933 | Foust | 310/24 |
| 2,734,969 | 2/1956 | Mallory | 200/301 A X |
| 3,542,495 | 11/1970 | Barthalon | 310/246 |
| 4,093,880 | 6/1978 | Teal | 310/24 |
| 4,317,058 | 2/1982 | Blalock | 310/24 |

Primary Examiner—Donovan F. Duggan
Attorney, Agent, or Firm—William M. Hobby, III

[57] ABSTRACT

An electromagnetic motor apparatus is used for converting electrical energy into rotary motion and includes a housing having a crankshaft rotably mounted therein. A plurality of stators form cylinders and are mounted onto the housing. A plurality of armatures form the pistons and are movably mounted to slide in the stators. Each armature has an armature piston rod connected to each armature and to the crankshaft for turning the crankshaft responsive to the movement of the armatures in a timed sequence. A distributor is operatively connected to the crankshaft for distributing electrical energy applied to the distributor from the distributor to the stator windings. The distributor has at least one pair of electrical contacts moving in a liquid bath responsive to the rotation of the crankshaft to direct electrical energy to the stator in timed sequence so that electrical arcing is reduced in the distribution of the electrical energy in an electromagnetic motor.

3 Claims, 4 Drawing Figures

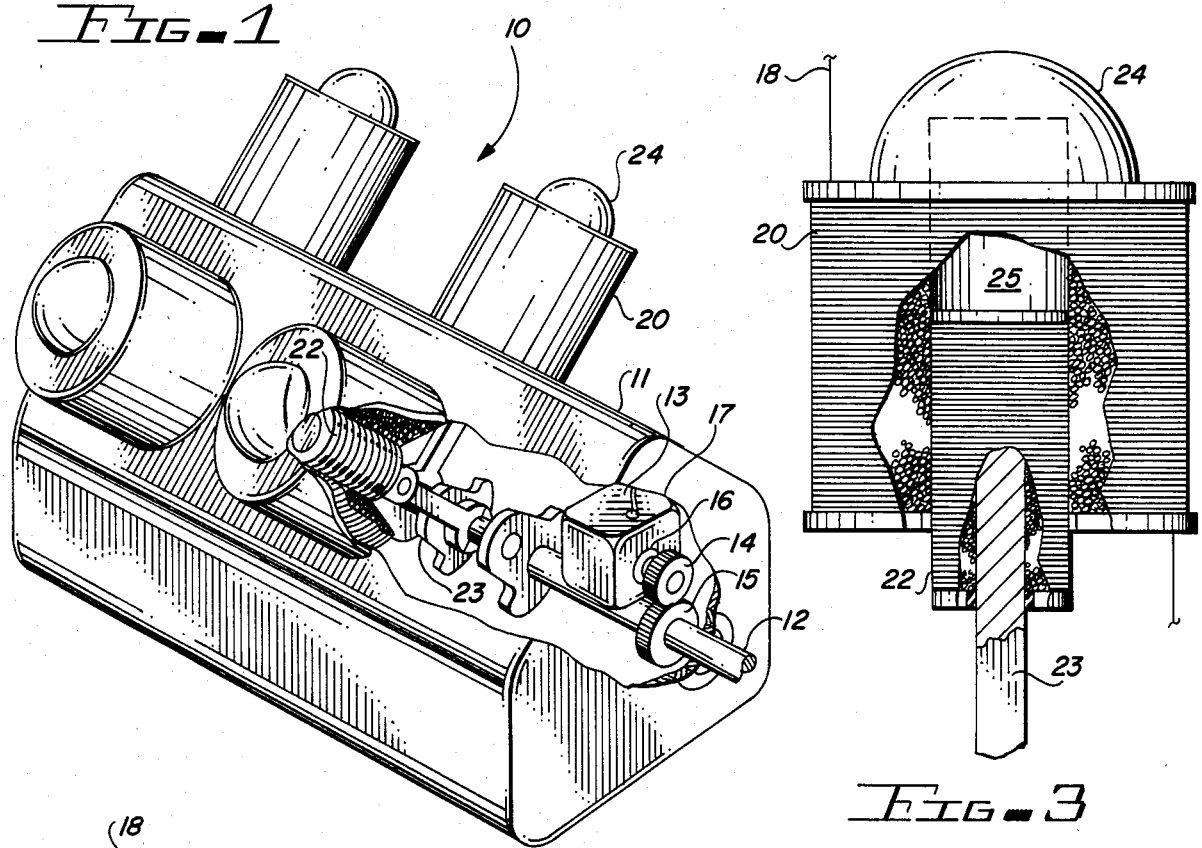
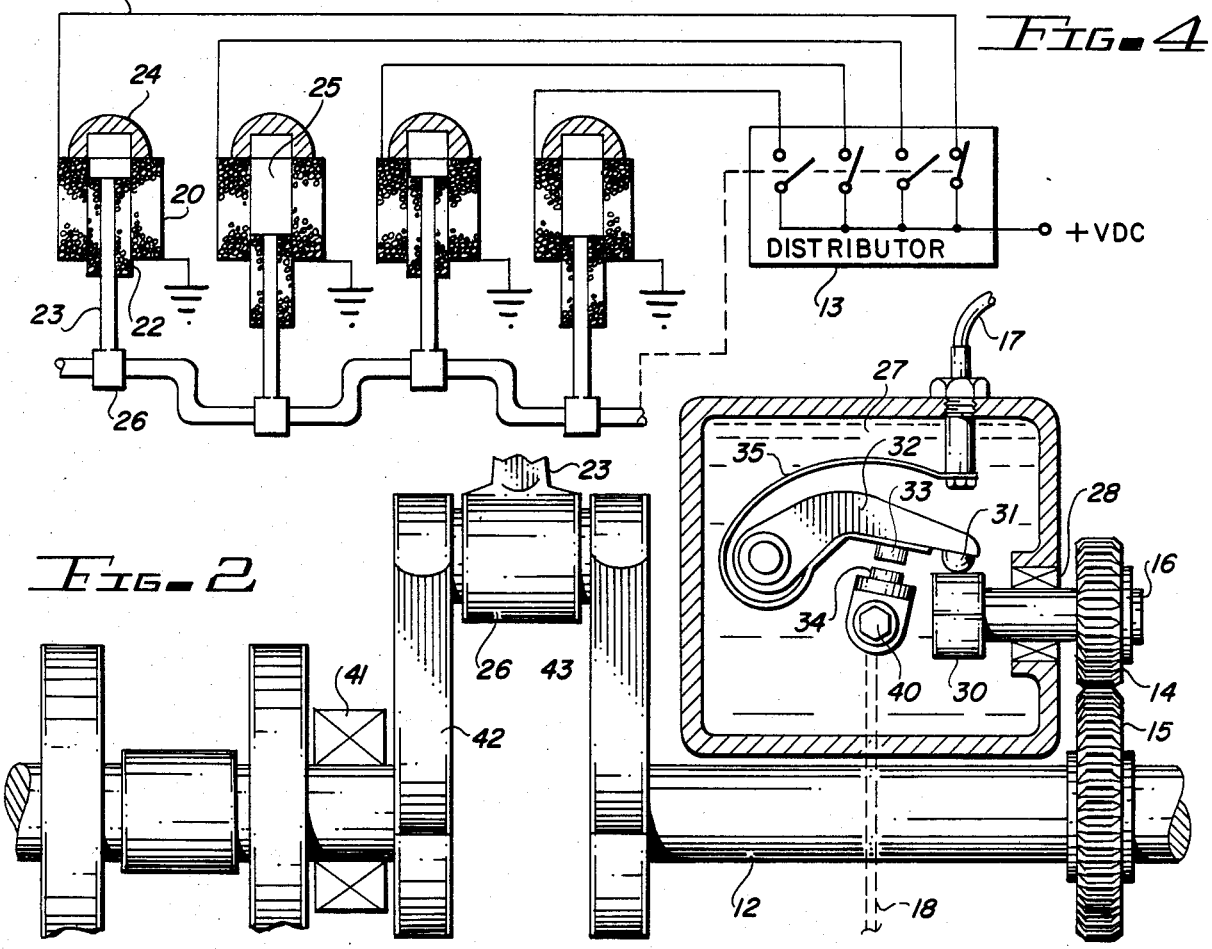

ELECTROMAGNETIC MOTOR

BACKROUND OF THE INVENTION

The present invention relates to electric motors and especially to an electromagnetic motor for converting electrical energy into rotary motion for performing work.

In the past, a variety of electrical power plants have been provided including electromagnetic power plants having a crankshift with a plurality of cranks thereon and with a plurality of solenoids, each of which is connected to a separate crank in such a manner that sequential operation of the solenoids will cause rotation of the crankshaft. Examples of this type of motor are disclosed by the Patents to Reynolds et al, U.S. Pat. No. 1,349,100, Moodyman, U.S. Pat. No. 1,886,040 and Morch, U.S. Pat. No. 2,338,005. In this type of structure, the cores of the solenoids drive the crankshift directly.

Other prior U.S. Patents include the Dotson U.S. Pat. No. 3,328,656 for a reciprocating motor control system for solenoids having high Q solenoid coils. The Erdoesy U.S. Pat. No. 3,694,679 for an electromagnetic engine. The Mills U.S. Pat. No. 3,832,608 for electromagnetic motors and processes of their operation. The Ramirez U.S. Pat. No. 3,939,367 for a magnetically actuated reciprocating engine. The Davis et al, U.S. Pat. No. 4,019,103 for an electromagnetic motor and generator and a pair of Funderburg U.S. Pat. No. 4,179,631 and 4,228,373 for electromagnetic motors.

The most important prior art to the present invention appears to be taught by the Pecci U.S. Pat. No. 3,676,719 for an elecromagnetic motor with plural reciprocation members. The Pecci Patent shows an electromagnetic motor having soft iron cores sliding in coils mounted in the engine to form cylinders for driving piston rods for actuating gears. The piston rods are cylindrically mounted and drive the gears connected to a driveshaft. Electrical energy is distributed through a distributor mounted to the outside of the engine and rotated to form a plurality of contacts to interconnect the coils.

In contrast to this prior art, the present invention advantageously utilizes a distributor mounted within the block or housing and which it has a conventional pair of contacts submersed in a transformer oil to prevent arcing and provide a long life for the distributor. In addition, copper or aluminum wound armatures are provided for sliding within a similarly wound stator.

SUMMARY OF THE INVENTION

An electromagnetic motor for converting electrical energy into rotary motion for performing work has a housing or block with a conventional crankshaft rotably mounted therein. A plurality of stators are wound aluminum or copper wire form cylinders therein and are mounted to the housing. A plurality of armatures are formed of soft wound copper or aluminum wire to form pistons movably mounted to slide in the stators. A plurality of armature piston rods connects each armature to the crankshaft for turning the crankshaft responsive to movement of the armature in a timed sequence. A distributor is operatively connected to the crankshaft for distributing electrical energy applied to the distributor and from the distributor to the stator windings. The distributor has at least a pair of electrical contacts moving therein in a liquid bath responsive to the rotation of the crankshaft to direct electrical energy to each stator in timed sequence so that the electrical arcing is reduced in the distributor of the electromagnetic motor.

BRIEF DESCRIPTION OF THE DRAWINGS

Other objects, features and advantages of the present invention will be apparent from the written description and the drawings in which:

FIG. 1 is a cutaway perspective view of an electromagnetic motor in accordance with the present invention;

FIG. 2 is a side elevation of a portion of the crankshaft and connecting rods;

FIG. 3 is a cutaway side elevation of the stator and armature windings; and

FIG. 4 is a timed sequence of interconnecting of armatures and windings.

DESCRIPTION OF THE PREFERRED EMBODIMENT

Referring to the drawings, and especially to FIG. 1, an electromagnetic motor 10 is illustrated having a housing 11 having a crankshaft 12 mounted therein. The crankshaft 12 has a distributor 13 mounted inside the housing 11 and connected by a rotating gear 14 to a rotating gear 15 connecting to the crankshift 12. The rotating gear 14 is connected to a shaft 16 passing into the housing of the distributor 13. A conductor 17 is connected into the distributor from a power source while a plurality of conductors 18 leaves a distributor and connects four separate stators 20. Each stator 20 is wrapped aluminum or copper wire wrapped around a sleeve 21 to form a stator for cooperation with an armature 22, which is also wrapped soft aluminum or copper wire wrapped around a portion of a piston or armature rod 23. Metal piston surfaces 19 and 29 are positioned on either end of the armature 22. A soft iron dome 24 is mounted above the stator windings 20 so that each armature sliding in the piston portion 25 of the stator 20 will also form compressed air for pushing the armature piston 22. Each rod 23 has a crankshaft connecting portion 26 and may have bearings, bushings or sleeves therein.

The distributor 13 is filled with a transformer oil 27 in a sealed unit, while the shaft 16 is supported on a bearing 28 and connects to a rotating cam 30. The rotating cam pushes a cam follower 31 which in turn operates the distributor contact base 32 alternately interconnecting electrical contacts 33 and 34. One set of contact points is shown but the distributor has four sets of contact points, each being driven by the cam 30 in timed sequence. The four contact points are illustrated in diagramatic form in FIG. 2, each being connected to the same power source but with a seperate output connected to each stator. An electrical input wire 17 is connected through a conductor 35 within the liquid 27 to the contact 33, while a plurality of conductors 18 is connected through a screw fastener 40, through the housing for the distributor 13, to each of the stators. Thus the timing is achieved for the distributor by having the gear 15 connected to the timing gear 14 for directly driving the distributor points. Advantageously, the transformer liquid 27, filling the distributor 13 has been shown to prevent the usual arcing between the points 33 and 34 as they approach or extend from each other and thereby provides for long-lasting points without the usual arcing problems. In addition, the transformer oil acts as a lubricant for the cam 30 to prevent wear from the cam followers 31 and eliminating the need for a bearing type cam follower. The distributor does, however, require a sealed unit. The crankshaft 12 is mounted in a plurality of crankshaft bearings 41 and has balanced arms 42 along with crankshaft pin members 43 connecting to the piston rods 23.

It should be clear at this point that an electromagnetic motor or engine has been provided which uses linear moving armatures sliding in fixed cylindrically stators and which has a dome top for providing an efficient driving solenoid type member driven in sequence by an oil filled distributor having a plurality of contact points therein mounted within the motor housing. It should, however, be clear that the present invention is not to be considered as limited to the form shown which would be considered illustrative rather than restrictive.

I claim:

1. An electromagnetic motor for conveying electrical energy into rotary motion comprising in combination;
    a housing;
    a crankshaft rotably mounted in said housing;
    a plurality of stators forming cylinders therein mounted onto said housing each said stator having a plurality of metal windings around a sleeve;
    a plurality of armatures forming pistons and movably mounted to slide in said stators each said armature having a pluarality of metal windings around a soft iron core;
    a plurality of armature piston rods, each piston rod being connected to one armature and to said crankshaft responsive to movement of the armatures in a timed sequence;
    a distributor operatively connected to the crankshaft for distributing electrical energy applied to the distributor and for applying electrical energy applied thereto to the stator windings, said distributor being a sealed unit filled with a transformer oil and having at least a pair of electrical contacts moving in said transformer oil responsive to the rotation of the crankshaft to direct electrical energy to each stator in timed sequence whereby electrical arcing is reduced in the distributor of an electromagnetic motor; and
    a soft iron dome mounted atop each stator to form a sealed cylinder allowing compression of air therein responsive to the movements of the armature therein.

2. An electromagnetic motor in accordance with claim 1 in which said distributor unit has cam actuated electrical contacts therein mounted in said transformer oil, said cam being connected to a shaft connected to a timing gear, connected to a driveshaft gear, connected to the crankshaft of said electromagnetic motor.

3. An electromagnetic motor in accordance with claim 2 in which each said armature has a metal piston surface across the top and bottom thereof.

* * * * *